(12) United States Patent
Kinds et al.

(10) Patent No.: US 8,931,525 B2
(45) Date of Patent: Jan. 13, 2015

(54) INJECTING DEVICE AND METHOD OF FILLING A HOLDER WITH SEPARATED LIQUID LAYERS

(75) Inventors: Diederik Jasper Kinds, Hoogstraten (BE); Fedde Martijn Poppenk, Delft (NL); Philip Markus Van Meer, Delft (NL)

(73) Assignee: Layernation Beverage Solutions B.V., Weert (NL)

( * ) Notice: Subject to any disclaimer, the term of this patent is extended or adjusted under 35 U.S.C. 154(b) by 330 days.

(21) Appl. No.: 13/520,143

(22) PCT Filed: Jan. 7, 2011

(86) PCT No.: PCT/NL2011/050014
§ 371 (c)(1),
(2), (4) Date: Aug. 16, 2012

(87) PCT Pub. No.: WO2011/084062
PCT Pub. Date: Jul. 14, 2011

(65) Prior Publication Data
US 2013/0014857 A1     Jan. 17, 2013

(30) Foreign Application Priority Data
Jan. 7, 2010   (NL) .................................... 2004075

(51) Int. Cl.
*B67D 1/08*      (2006.01)
*B67D 1/00*      (2006.01)
*A47J 31/00*     (2006.01)

(52) U.S. Cl.
CPC ............. *B67D 1/0041* (2013.01); *A47J 31/002* (2013.01); *B67D 1/0888* (2013.01); *B67D 1/0894* (2013.01)

USPC ............... 141/104; 141/11; 141/69; 141/105; 141/374

(58) Field of Classification Search
CPC .... A47J 31/002; B67D 1/0041; B67D 1/0888
USPC .......................... 141/1, 11, 69, 104–106, 374
See application file for complete search history.

(56) References Cited

U.S. PATENT DOCUMENTS 654,879 A * 7/1900 Dineen ........................ 141/284
2,740,571 A * 4/1956 Busto .............................. 141/94
(Continued)

FOREIGN PATENT DOCUMENTS

CA       2324428 A1 *  4/2001  ............... B67D 5/56
DE   20 2007 006521 U1    8/2007
(Continued)

*Primary Examiner* — Nicolas A Arnett
(74) *Attorney, Agent, or Firm* — Daniel G. Stoddard; Bret E. Field; Bozicevic, Field & Francis LLP

(57) ABSTRACT

An injecting device for filling a holder with separated liquid layers is provided herein. The device includes at least two containers for holding different liquids, an injector for filling a holder with separated liquid layers and moving means for setting the distance between the holder and the injector. A method for filling a holder with separated liquid layers is also provided. The method includes the steps of placing a holder with bottom, disposing inside the holder, and at a predetermined distance from the bottom of the holder, a feed conduit with an outflow opening for dispensing liquid, and allowing different liquids to flow sequentially out of the feed conduit, wherein the distance between the outflow opening and the bottom is maintained.

20 Claims, 2 Drawing Sheets

(56) References Cited

U.S. PATENT DOCUMENTS

| | | | |
|---|---|---|---|
| 2,767,737 A | 10/1956 | Turak | |
| 2,771,913 A * | 11/1956 | Flasnocker | 141/9 |
| 3,185,189 A * | 5/1965 | Reid | 141/100 |
| 4,126,164 A * | 11/1978 | Magnifico | 141/286 |
| 4,800,934 A * | 1/1989 | Boissoneault | 141/106 |
| 5,163,488 A * | 11/1992 | Basch | 141/100 |
| 6,840,158 B2 * | 1/2005 | Cai | 99/323.1 |
| 7,013,933 B2 * | 3/2006 | Sher et al. | 141/99 |
| 7,490,638 B2 * | 2/2009 | Sher et al. | 141/100 |
| 7,997,305 B2 * | 8/2011 | Haramis et al. | 141/100 |
| 8,726,948 B2 * | 5/2014 | Haramis et al. | 141/100 |
| 2007/0235103 A1 * | 10/2007 | Taverna | 141/100 |
| 2008/0241322 A1 * | 10/2008 | Bunge | 426/238 |
| 2009/0211662 A1 * | 8/2009 | Haramis et al. | 141/9 |
| 2011/0297272 A1 * | 12/2011 | Hammonds et al. | 141/1 |

FOREIGN PATENT DOCUMENTS

| | | |
|---|---|---|
| GB | 692795 A | 6/1953 |
| NL | 7409454 A | 1/1975 |
| WO | WO 2006/053456 A1 | 5/2006 |

* cited by examiner

INJECTING DEVICE AND METHOD OF FILLING A HOLDER WITH SEPARATED LIQUID LAYERS

INTRODUCTION

The present invention relates to a device comprising:
at least two containers for holding different liquids;
an injector for filling a holder with separated liquid layers which is connected to the containers via a channel system; and
moving means for setting the distance between the holder and the injector.

The present invention also relates to a method for filling a holder with separated liquid layers.

BACKGROUND

Such a device and method are known from the publication DE 20 2007 006 521. This publication shows a device for filling a drinking glass with separated liquid layers. The device comprises one injector which is connected via three channels to three liquid reservoirs. The injector is provided with three separated feed conduits, each with its own outflow opening. Each individual feed conduit is connected to only one liquid reservoir. The orientation of the outflow opening for the liquid which flows first into the drinking glass is directed downward, i.e. it is directed during use toward the bottom of the holder. The outflow openings for the liquids injected after the first liquid are directed toward the side walls of the drinking glass so that these liquids flow downward from the side wall. The effect hereof is that the flow of the liquid along the side wall is slowed down. During use the injector is first moved downward in the holder. The drinking glass is then filled with the first liquid. As the liquid level in the drinking glass rises, the injector moves upward and at a chosen moment there is a changeover to a different liquid and outflow opening. A drinking glass is thus filled with a layered liquid composition by means of the device. During filling the moving means set the height of the injector, and so the distance between the injector and the holder, for each layer.

A drawback of such a device is the complicated design of the injector through which different conduits with specific outflow openings are provided. Each conduit has its own pump here, this being a drawback in respect of the maintenance and vulnerability of the device. Another problem is that the inflow of liquids along the side walls does not slow down the flow sufficiently, whereby an optimal separation of layers is not obtained.

It is noted that there are a number of reasons why an optimal boundary layer, i.e. a sharp boundary layer, is desirable. A first reason is the visual effect of the layered drink in the glass. When the different liquids of the layered drink each have for instance a different colour, a visual effect can be achieved in that each layer as it were forms a colour with sharp contrasts, for instance similar to colour combinations of national flags, or corresponding to a company logo. If separating layers are not sufficiently sharp, the obtained layered drink will appear indistinct or untidy, which is undesirable. A second reason is the taste effect which occurs when the different liquids of a layered drink mix with each other. Owing to a sharp boundary layer between the different liquids (e.g. alcoholic drinks) of the obtained drink this taste effect will only occur in the mouth of a person consuming the drink. A sharp boundary layer between the liquids thus achieves that the user experiences this taste effect optimally during consumption.

SUMMARY

The present invention has for its object to obviate or reduce the above stated drawbacks of the prior art. The invention provides for this purpose a device according to the appended claims, in particular according to the independent claims.

In a first aspect the invention relates to a device as claimed in claim 1. The injector is provided here with one feed conduit with outflow opening, whereby the design of the device becomes simpler. It is thus possible to reduce the dimensions of the injector, since only one feed conduit is present in the injector. Smaller holders, or drinking glasses, with narrower entry can thus be filled. Because such a device has a decreased complexity, maintenance is simpler and the device more durable.

The invention has diverse preferred embodiments which are defined in the dependent claim and/or will become apparent from the following description of several such embodiments. The advantages and the inventive features of the invention in all its aspects, including the measures defined in the dependent claims, are by no means limited to the considerations stated above and/or below.

A preferred embodiment of the device according to the invention has the feature that the moving means are suitable to set the outflow opening at a predetermined distance from the bottom of the holder, this distance being in the order of millimeters. When a layered liquid composition is arranged in a holder, it is desirable to form a boundary layer which is the sharpest possible separation. It has been found that the sharpness of the boundary layer between two layers is influenced by the distance between the bottom of the holder and the outflow opening. An optimal boundary layer is obtained at a predetermined distance between the outflow opening and the bottom of the holder. The distance is relatively short, in the order of millimeters, preferably 3 mm or less. A distance of 1, 2 or 3 mm is for instance suitable.

It is particularly recommended that the injector comprise a spacer for setting the above stated distance between the outflow opening and the bottom of the holder. It is favourable here for the injector to be provided with a spacer which protrudes beyond the outflow opening. It is thus possible to always place the outflow opening at the same position each time relative to the bottom of the holder. A result hereof is that the boundary layer between two layers is substantially the same each time, and is thus reproducible.

As alternative to the spacer, the device can comprise a control unit for the moving means which set the distance between the outflow opening and the bottom of the holder at a predetermined value. A predetermined distance between the feed conduit and the bottom of the holder can be set in reproducible manner by allowing the control unit to operate the moving means, with the above stated advantages thereof. If the short distance between the outflow opening and the bottom of the holder is maintained during filling, the sequence in which liquids are added must be such that they have an increasing density.

According to a subsequent preferred embodiment of the device according to the invention, the device comprises a pump for causing liquid to flow out of the outflow opening. Owing to the pump the liquids can be introduced into the holder as quickly as possible, this being desirable in practice.

It is favourable here that a control unit operates the pump so that the flow rate of liquid out of the outflow opening is reduced while a boundary layer is being formed between sequential liquids. Forming a boundary layer between sequential liquids is here understood to mean that a first liquid flows first into the holder, and then a second liquid. Because the liquids flow into the holder one after the other, they will not mix and layers are created. The boundary layer is the transition from the first liquid to the second. By reducing the pump speed when the first liquid has flowed into the holder and increasing it again when a part of the second liquid has flowed into the holder, mixing of the two liquids at the boundary layer is minimized. An acceptable overall time duration for the filling can still be achieved here for complete filling of the drinking glass with the layered drink.

Yet another embodiment of the device according to the invention has the feature that the device comprises a control unit which operates the moving means so that the outflow opening follows the liquid surface of the uppermost liquid during filling of the holder, wherein the distance between the outflow opening and the liquid surface is preferably 5 mm or less, more preferably 3 mm or less. During filling of the holder with liquids the control unit operates the moving means so as to move the feed conduit upward. The outflow opening preferably remains here at the level of the liquid surface so that the effect of gravity on the liquid is as small as possible. Instead of being exactly at the level of the liquid surface, the outflow opening can be moved to a position a short distance above the liquid surface, for instance in the order of millimeters, in particular a distance of 5 mm or less, preferably 3 mm or less. A distance of 0 mm is included in this definition. Such a co-displacement of the outflow opening with the liquid surface is suitable to allow liquids to flow into the holder in order of decreasing density, while the occurrence of turbulences in the boundary surface is minimized.

The outflow opening of the feed conduit preferably lies in a horizontal plane. The outflow opening is defined as an exit plane for the liquids which is bounded by the outer end of the feed conduit. When the outflow opening lies in a horizontal plane, the flow of a liquid out of the outflow opening will be substantially equal in all directions. A result hereof is that fewer turbulences will occur when the liquid is arranged, this being advantageous for the formation of a sharp boundary layer.

It is noted in this respect that the inner diameter of the feed conduit also determines the flow rate at the outflow opening. The feed conduit has for instance an inner diameter of about 4 to 6 mm. A suitable inner diameter lies between 1 mm and 12 mm inclusive, preferably 2 mm and 8 mm inclusive.

It is further desirable that in the injection device the flow rate is relatively high in the whole channel system and relatively low in the vicinity of the outflow opening. In a variant of the invention the feed conduit is for this purpose widened at the position of the outflow opening so that the outflow opening has a larger diameter than the feed conduit upstream.

According to another variant of the invention, a body is arranged inside the feed conduit and the body is preferably placed centrally in the feed conduit, and extends as far as the outflow opening. The body has the purpose of ensuring sufficient adhesion between tube and liquid in order to cause the liquid to be in contact with the inner surface of the tube and not allow "free-fall" through the tube. A consequence is a low flow rate at the outflow, opening of the feed conduit, this low outflow rate contributing toward the formation of a better, sharper boundary layer.

It is further favourable for the movement of the feed conduit relative to the bottom of the holder to be continuously variable. One advantage of a continuously variable movement of the feed conduit is that any desired thickness of a liquid layer is possible. Another advantage is that, when the holder is filled from the bottom and the feed conduit moves upward through the liquids after filling, less disruption of the liquid layers occurs. With a stepped movement there will be a jerkier movement which may result in disruption of the boundary layers.

It is further possible for the device to further comprise an input unit which is connected to the control unit for the purpose of selecting at least two liquids. When more than two containers for holding liquid are present, more combinations of liquids are possible. The convenience of use of the device is improved by providing the device with an input unit. It is relatively simple to select different combinations of the liquids. The valves in the channel system are operated here by the control unit. It is noted that the input unit can for instance be a touchscreen monitor. Using the touchscreen monitor a user of the device can make a selection of at least two liquids in simple manner.

Yet another embodiment of the device according to the invention has the feature that the device comprises a memory unit with stored data of specific combinations of at least two liquids, wherein the specific combinations can be selected via the input unit. When there are more than two containers for holding liquid, it may be desirable to enable quick selection of a number of known combinations of the liquids. These known combinations can be selected directly via the input unit. In situations where many holders have to be filled with separated liquid layers in a short time, it can be very favourable to have such a selection method. The liquids in the containers must correspond to the data in the memory unit.

According to a second aspect, the present invention relates to a method for filling a holder with separated liquid layers, which comprises the steps of placing a holder with bottom, disposing inside the holder, and at a predetermined distance from the bottom of the holder, a feed conduit with an outflow opening for dispensing liquid, and allowing different liquids to flow sequentially out of the feed conduit, wherein the distance between the outflow opening and the bottom is maintained. The predetermined distance has a favourable effect on the formation of a sharp boundary layer, as already elucidated above. The preferred distance of 1 to 3 mm between outflow opening and bottom also applies here.

The different liquids preferably have different densities, wherein the liquids flow out of the feed conduit in order of increasing density. The outflow opening is held here at a fixed, favourable distance, resulting in the above stated advantages.

The present invention also relates to a method for filling a holder with separated liquid layers, the method comprising the steps of placing a holder with bottom, disposing inside the holder, and at a predetermined distance from the bottom of the holder, a feed conduit with an outflow opening for dispensing liquid, and allowing liquids to flow sequentially out of the feed conduit, wherein the outflow opening follows the liquid surface of the uppermost liquid during filling of the holder. The preferred distance of 0 to 5 mm between outflow opening and liquid surface, in particular 0 to 3 mm, also applies here.

The different liquids preferably have different densities, wherein the liquids flow out of the feed conduit in order of decreasing density. The advantages have already been stated above.

BRIEF DESCRIPTION OF THE DRAWINGS

Following hereinbelow is a description of several embodiments which are shown in the accompanying drawings and provided solely by way of example, and in which the same or similar parts, components and elements are designated with the same reference numerals, and in which.

DETAILED DESCIPTION

Figure 1:
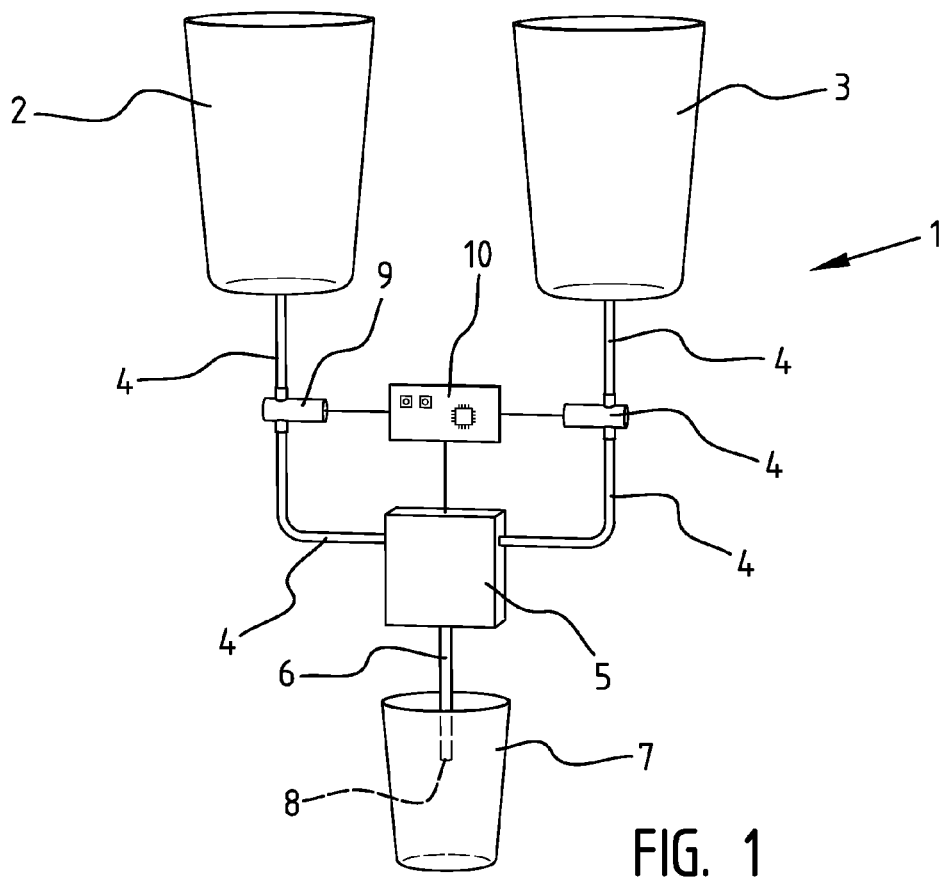
FIG. 1 shows a schematic view of the device.

FIG. 1 shows a schematic view of device 1 according to the invention. The device comprises two liquid containers 2, 3, each comprising a liquid, wherein each of the liquids has a different specific density. The liquid containers are connected via channel system 4 to unit 5, which comprises the pump and the moving means (not further shown). Valves 9 which can selectively close off the feed from a liquid container 2, 3 are arranged in channel system 4. Unit 5 and valves 9 are each operated by control unit 10. A feed conduit 6 with an outflow opening 8 extends from unit 5 which comprises the pump and the moving means (not further shown). A holder 7 is placed under unit 5, wherein feed conduit 6 can be moved up and downward relative to holder 7 by the moving means.

Figure 2A:
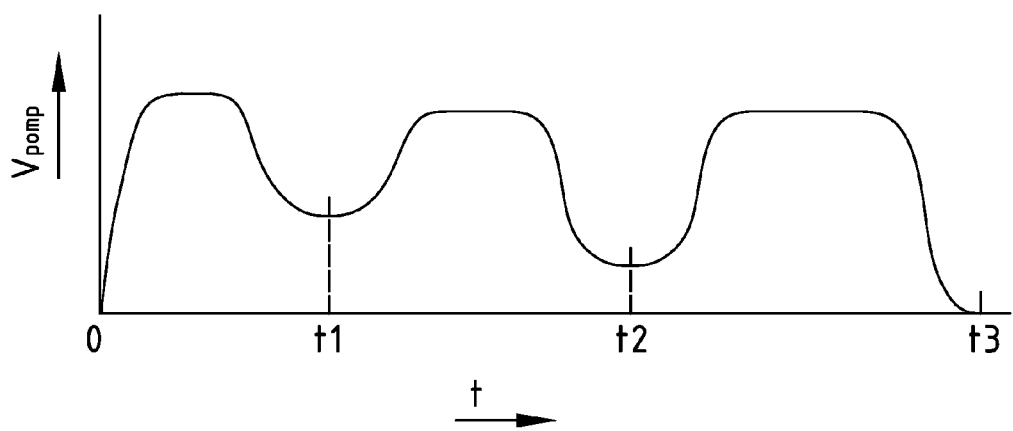
FIG. 2A shows a progression of a pump speed through time.
Figure 2B:
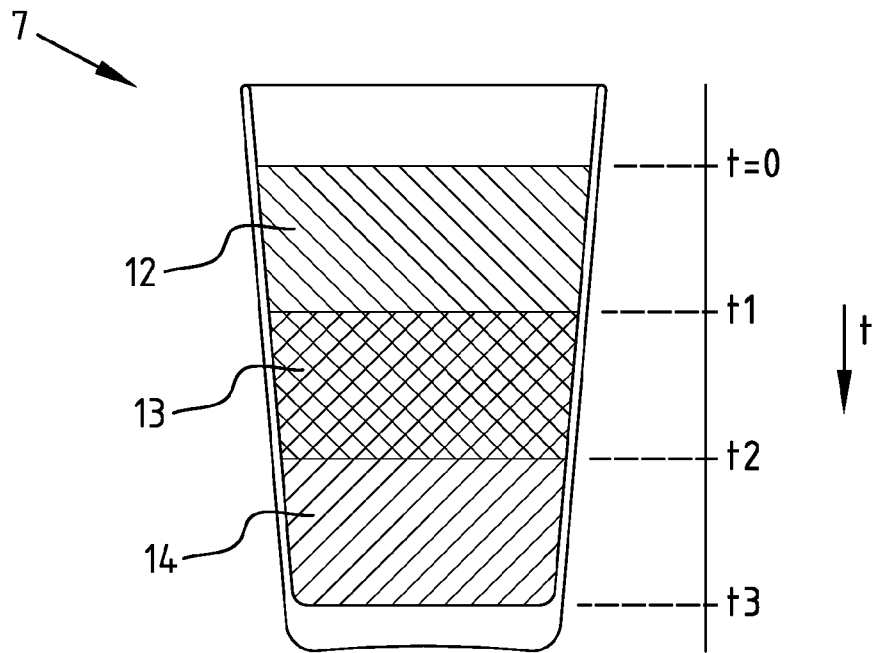
FIG. 2B shows a holder with a time axis shown alongside.
Figure 3:
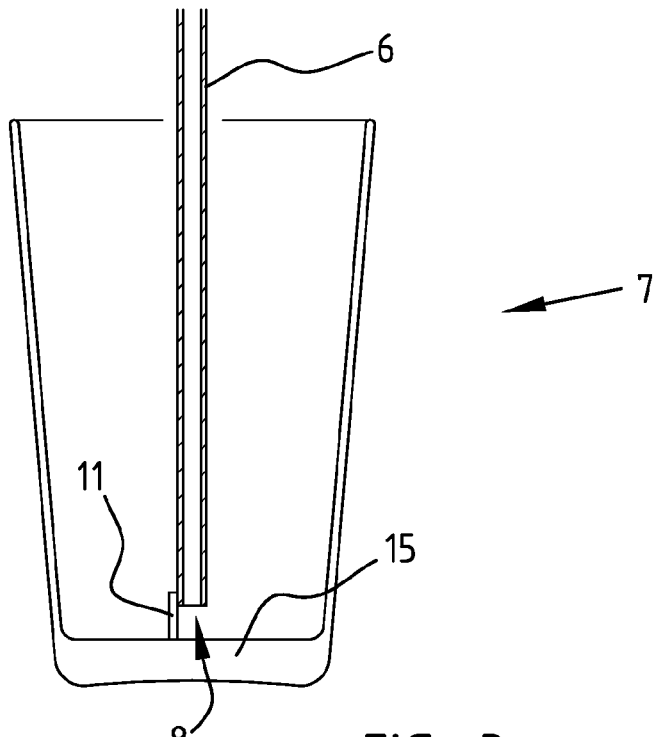
FIG. 3 shows a cross-sectional schematic view of a feed conduit with spacer in a holder.

FIGS. 2A and 2B show the progression of the pump speed over time during filling of holder 7 with successive liquid layers 12, 13, 14, where the density of the successive liquids increases. In these figures holder 7 is filled while the outflow opening is held a fixed distance from the bottom so that each successive liquid layer is formed under the previous liquid layer. The filling of the holder starts at t=0 with a first layer of liquid 12 being pumped into holder 7. At t=t1 a boundary layer is formed between first liquid layer 12 and second liquid layer 13. The pump speed decreases at around time t1 and increases again after formation of the boundary layer. At t=t2 the process is repeated in corresponding manner so as to form a boundary layer between second liquid layer 13 and a third liquid layer 14. If desired, the decrease and increase in the pump speed can differ at formation of a boundary layer between two successive liquids. At t=t3 holder 7 is full, pumping of liquid is stopped and the drink is ready for consumption. FIG. 3 shows an enlarged schematic view of holder 7 during use. A feed conduit 6 is situated in holder 7 and a spacer 11 protrudes beyond an end of feed conduit 6. Spacer 11 ensures that a specific distance remains between outflow opening 8 and bottom 15 of the holder.

After examination of the foregoing many alternative and additional embodiments will occur to the skilled person, all lying within the scope of the present invention as defined in the appended claims. Only when an embodiment departs from the letter or spirit of the specific definitions of the scope of protection, in particular the independent claims, is it no longer an embodiment according to the invention.

It is thus possible for sensors to be situated in the containers for the purpose of determining the specific density and for these sensors to be coupled to the control unit. In this way the device can itself determine which combinations of liquids are possible.

The invention claimed is:

1. An injecting device for filling a holder having a bottom with separated liquid layers, comprising:
    at least two containers for holding different liquids having different densities;
    an injector for filling the holder with separated liquid layers, the injector comprising one feed conduit with an outflow opening and being connected to the containers via a channel system, wherein the channel system comprises a plurality of controllable valves for allowing different liquids to flow sequentially out of the feed conduit; and
    a moving unit comprising a mover for setting the distance between the holder and the injector, wherein the moving unit is connected in the channel system between the controllable valves and the feed conduit, and
    a control unit configured to control the different liquids to flow sequentially out of the feed conduit in order of increasing density, and to maintain a distance between the outflow opening and the bottom when the control unit controls the different liquids to flow out of the feed conduit.

2. The device as claimed in claim 1, wherein the mover is suitable to set the outflow opening at a predetermined distance from the bottom of the holder, this distance being in the order of millimeters.

3. The device as claimed in claim 2, further comprising a spacer for setting the distance between the outflow opening and the bottom of the holder, which spacer is connected to the injector.

4. The device as claimed in claim 3, wherein the spacer protrudes beyond the outflow opening.

5. The device as claimed in claim 2, wherein the control unit is associated with the feed conduit so that the distance between the outflow opening and the bottom of the holder is set at a predetermined value.

6. The device as claimed in claim 2, wherein the distance between the outflow opening and the bottom of the holder is 3 mm or less.

7. The device as claimed in claim 1, wherein the moving unit further comprises a pump for causing liquid to flow out of the outflow opening.

8. The device as claimed in claim 7, wherein the control unit operates the pump so that the flow rate of liquid out of the outflow opening is reduced while a boundary layer is being formed between sequential liquids.

9. The device as claimed in claim 1, wherein the outflow opening of the feed conduit lies in a horizontal plane.

10. The device as claimed in claim 1, wherein a movement of the feed conduit relative to the bottom of the holder is continuously variable.

11. The device as claimed in claim 1, further comprising an input unit which is connected to the control unit and configured for selecting at least two liquids.

12. The device as claimed in claim 11, further comprising a memory unit with stored data of specific combinations of at least two liquids, wherein the specific combinations can be selected via the input unit.

13. A use of a device as claimed in claim 1 for performing a method comprising the steps of:
    placing a holder with bottom;
    disposing inside the holder, and at a predetermined distance from the bottom of the holder, a feed conduit with an outflow opening for dispensing liquid; and
    allowing different liquids to flow sequentially out of the feed conduit, wherein the distance between the outflow opening and the bottom is maintained.

14. A method for filling a holder with separated liquid layers, comprising the steps of:
    placing a holder with a bottom;
    disposing inside the holder, and at a predetermined distance from the bottom of the holder, a feed conduit with an outflow opening for dispensing liquid; and
    allowing different liquids having different densities to flow sequentially out of the feed conduit, wherein the distance between the outflow opening and the bottom is maintained when the liquids are flowed out of the feed conduit, and wherein the liquids are flowed out of the feed conduit in order of increasing density.

15. The method as claimed in claim 14, further comprising the step of:
   reducing the flow rate of liquid out of the outflow opening while a boundary layer is being formed between sequential liquids.

16. The method as claimed in claim 14, wherein the outflow opening of the feed conduit lies in a horizontal plane.

17. The method as claimed in claim 14, wherein the feed conduit extends from a moving unit comprising a mover configured for adjusting the distance between the outflow opening and the bottom.

18. The method as claimed in claim 17, wherein the channeling unit further comprises a pump configured for flowing the liquids out of the feed conduit.

19. The method as claimed in claim 18, wherein allowing different liquids having different densities to flow sequentially out of the feed conduit comprises flowing the different liquids into the moving unit.

20. The method as claimed in claim 14, wherein the feed conduit comprises a spacer for setting the distance between the outflow opening and the bottom of the holder.

* * * * *